(12) United States Patent
Gao et al.

(10) Patent No.: US 9,672,851 B1
(45) Date of Patent: Jun. 6, 2017

(54) SINGLE WRITER INTERLACED MAGNETIC RECORDING

(71) Applicant: Seagate Technology LLC, Cupertino, CA (US)

(72) Inventors: Kaizhong Gao, North Oaks, MN (US); Steven Granz, Shakopee, MN (US); Gene Sandler, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/146,623

(22) Filed: May 4, 2016

(51) Int. Cl.
G11B 11/00 (2006.01)
G11B 5/55 (2006.01)
G11B 5/00 (2006.01)

(52) U.S. Cl.
CPC .... G11B 5/5526 (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,030,130 A * | 6/1977 | Smith | G11B 5/59633 360/77.05 |
| 4,298,897 A | 11/1981 | Arter et al. | |
| 4,535,372 A * | 8/1985 | Yeakley | G11B 21/085 360/77.05 |
| 4,622,601 A | 11/1986 | Isozaki et al. | |
| 4,646,168 A | 2/1987 | Sonobe et al. | |
| 4,771,346 A | 9/1988 | Shoji et al. | |
| 4,803,571 A | 2/1989 | Fujioka et al. | |
| 4,853,799 A | 8/1989 | Aikawa | |
| 5,010,430 A | 4/1991 | Yamada et al. | |
| 5,285,341 A | 2/1994 | Suzuki et al. | |
| 5,402,270 A | 3/1995 | McDonnell et al. | |
| 5,760,993 A | 6/1998 | Purkett | |
| 5,892,634 A | 4/1999 | Ito et al. | |
| 5,978,168 A | 11/1999 | Mathews et al. | |
| 6,052,797 A | 4/2000 | Ofek et al. | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2 | 7/2004 | Yamamoto | |
| 7,130,152 B1 | 10/2006 | Raymond et al. | |
| 7,259,927 B2 | 8/2007 | Harris | |
| 7,393,066 B2 | 7/2008 | Dugas et al. | |
| 7,440,222 B2 | 10/2008 | Nakamura et al. | |
| 7,573,682 B2 | 8/2009 | Pust et al. | |
| 7,872,829 B2 | 1/2011 | Sakai | |

(Continued)

FOREIGN PATENT DOCUMENTS

EP 0484774 A2 5/1992
EP 1564736 A2 8/2005

(Continued)

*Primary Examiner* — Peter Vincent Agustin
(74) *Attorney, Agent, or Firm* — Holzer Patel Drennan

(57) ABSTRACT

A storage device includes a storage medium, a magnetic recording head, and a controller configured to operate the magnetic recording head to write consecutive data tracks at a uniform written track width and further configured to write data to alternating data tracks of the consecutive data tracks prior to writing data to at least one track interlaced with the alternating data tracks.

20 Claims, 4 Drawing Sheets

(56) References Cited

U.S. PATENT DOCUMENTS

| | | | |
|---|---|---|---|
| 7,907,360 B2 | 3/2011 | Mak et al. | |
| 7,957,093 B2 | 6/2011 | Brand | |
| 7,965,465 B2 | 6/2011 | Sanvido et al. | |
| 8,023,215 B1 | 9/2011 | Ghaly et al. | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1 | 9/2013 | Bandic | |
| 8,599,510 B1 | 12/2013 | Fallone | |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2 | 4/2014 | Erden et al. | |
| 8,854,752 B2 | 10/2014 | Jin et al. | |
| 8,867,161 B2 | 10/2014 | Emo et al. | |
| 8,873,178 B2 | 10/2014 | Erden et al. | |
| 8,913,335 B2 | 12/2014 | Coker et al. | |
| 8,917,469 B1 | 12/2014 | Guo et al. | |
| 8,929,186 B1 | 1/2015 | Sharma et al. | |
| 8,976,478 B1 | 3/2015 | Harllee, III et al. | |
| 9,053,712 B1 | 6/2015 | Guo et al. | |
| 9,058,829 B1 | 6/2015 | Wolf et al. | |
| 9,082,458 B1 | 7/2015 | Tang | |
| 9,087,541 B1 | 7/2015 | Pokharel et al. | |
| 9,099,103 B1 | 8/2015 | Krichevsky | |
| 9,105,302 B1 | 8/2015 | Erden et al. | |
| 9,111,575 B1 | 8/2015 | Zhou et al. | |
| 9,111,578 B1 | 8/2015 | Hassel et al. | |
| 9,129,658 B1 | 9/2015 | Yamamoto | |
| 9,142,246 B1 | 9/2015 | Trantham et al. | |
| 9,153,287 B1 | 10/2015 | Hamilton et al. | |
| 9,324,362 B1 | 4/2016 | Gao | |
| 9,396,062 B1 | 7/2016 | Sridhara et al. | |
| 9,418,688 B1 | 8/2016 | Rausch et al. | |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1* | 11/2003 | Sakamoto | G11B 11/10508 369/13.06 |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1 | 10/2009 | Ehrlich | |
| 2009/0251821 A1 | 10/2009 | Song et al. | |
| 2010/0014183 A1 | 1/2010 | Aoki et al. | |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1 | 8/2012 | Watanabe et al. | |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki et al. | |
| 2015/0178161 A1 | 6/2015 | Burd et al. | |
| 2016/0148630 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1* | 5/2016 | Gao | G11B 20/1217 369/13.35 |
| 2016/0148644 A1* | 5/2016 | Zhu | G11B 20/1217 360/48 |
| 2016/0148645 A1* | 5/2016 | Zhu | G11B 20/1217 711/4 |

FOREIGN PATENT DOCUMENTS

| | | |
|---|---|---|
| JP | H02-240862 A2 | 9/1990 |
| WO | 2005-030869 A1 | 4/2005 |

* cited by examiner

SINGLE WRITER INTERLACED MAGNETIC RECORDING

BACKGROUND

As requirements for data storage density increase for magnetic media, cell size decreases. A commensurate decrease in the size of a writer is difficult because, in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is interlaced magnetic recording (IMR).

SUMMARY

Implementations disclosed herein provide a storage device including a storage medium, a magnetic recording head, and a controller that writes a series of consecutive data tracks to have a uniform written track width. The controller writes data to alternating data tracks in the series prior to writing data to at least one track interlaced with the alternating data tracks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

IMR systems utilize alternating data tracks of different written track widths and linear densities arranged with slightly overlapping edges. For example, tracks of different write widths can be created by using multiple differently-sized write elements or, in Heat-Assisted Magnetic Recording (HAMR) devices, by varying laser power on alternating data tracks. However, these techniques have shortcomings. For example, manufacturing processes for multi-writer heads are inherently more complex than manufacturing processes for single-writer transducer heads. Moreover, operating a laser continually at high power levels and/or varied power levels can significantly shorten the functional lifetime of a laser.

Figure 1:
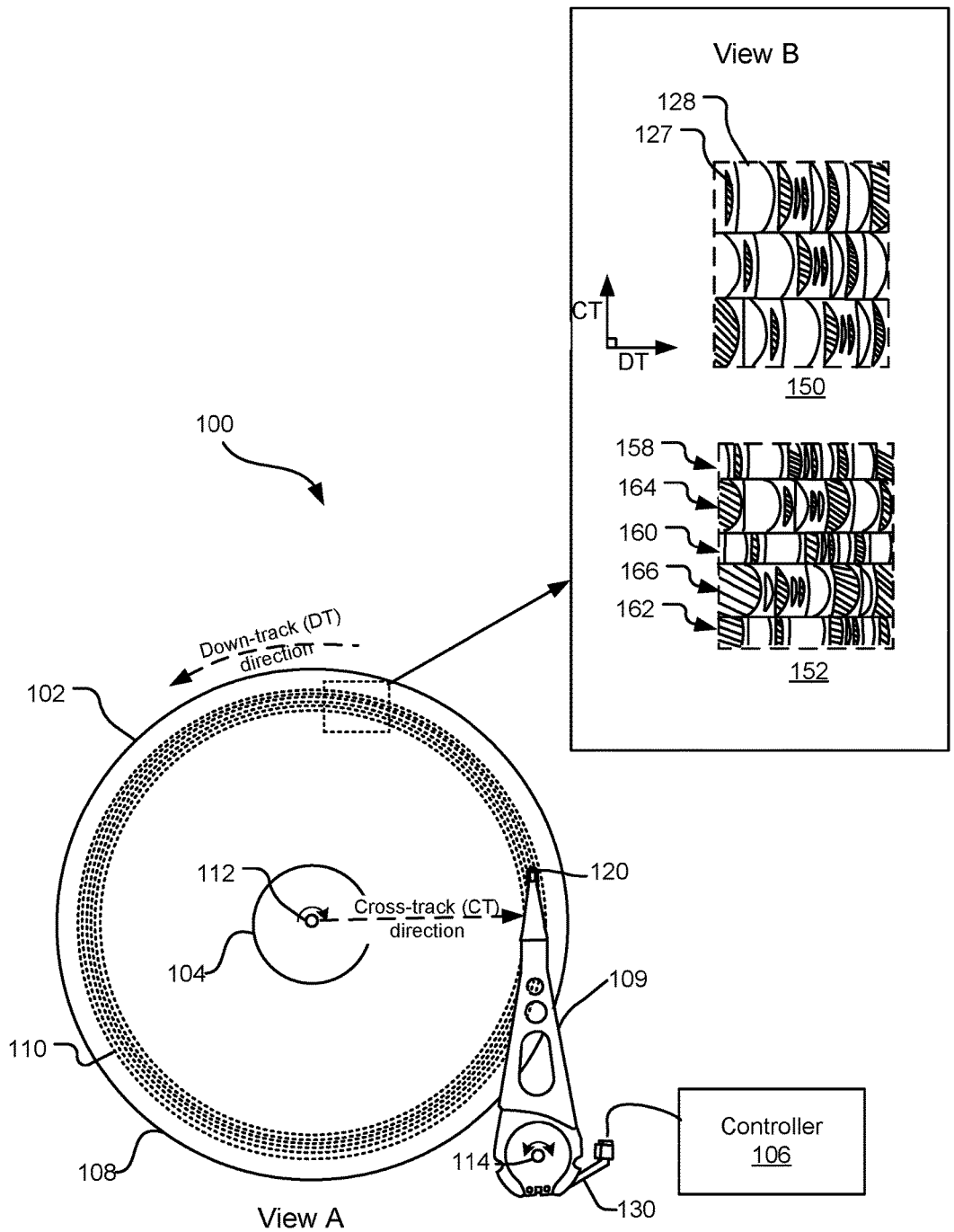
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114 and flies in close proximity above the surface of the storage medium 108 during disc rotation. The actuator assembly 109 rotates during a seek operation about the actuator axis of rotation 112 to position the transducer head assembly 120 over a target data track for each read and write operation.

The transducer head assembly 120 includes a writer (not shown) further including a write pole for converting a series of electrical pulses sent from a controller 106 into a series of magnetic pulses of commensurate magnitude and length. The magnetic pulses of the write pole selectively magnetize magnetic grains of the storage medium 108 as they pass below the pulsating writer. In some implementations, the transducer head assembly 120 includes a conventional perpendicular magnetic recording (CPMR) head. In other implementations, the transducer head assembly 120 includes a heat-assisted magnetic recording (HAMR) head that includes a heat source (e.g., a laser) that performs localized heating of the storage medium 108 to reduce the coercivity while recording data. This localized heating may allow an applied magnetic field of the writer to more easily affect magnetization of the storage medium 108.

View B illustrates magnified views 150 and 152 of a same surface portion of the storage media 108 according to different write methodologies. Specifically, the magnified views 150 and 152 include a number of magnetically polarized regions, also referred to herein as "data bits," along the data tracks of the storage media 108. Each of the data bits (e.g., a data bit 128) represents one or more individual data bits of a same state (e.g., is or 0s). For example, the data bit 128 is a magnetically polarized region representing multiple bits of a first state (e.g., "000"), while an adjacent data bit 127 is an oppositely polarized region representing one or more bits of a second state (e.g., a single "1"). The data bits in each of the magnified views 150 and 152 are not necessarily illustrative of the actual shapes or separations of the bits within an individual system configuration.

The magnified view 150 illustrates magnetic transitions recorded according to a conventional magnetic recording (CMR) technique. Under CMR, all written data tracks have a written track width equal to a defined track pitch (e.g., a center-to-center distance between directly adjacent data tracks). "Written track width" refers to, for example, a width of a data track measured in a cross-track direction of the storage medium 108. In CMR, each of the individual data tracks is randomly writeable, which means that the data tracks can each be individually re-written multiple times without significantly degrading data on other adjacent data tracks. With CMR, a maximum attainable areal storage density (ADC) is reduced as compared to an interlaced magnetic recording (IMR) technique illustrated in magnified view 152, described below.

The magnified view 152 illustrates magnetic transitions recorded according to an IMR technique that entails manipulating a write order of the data tracks and increasing linear density on select data tracks of the storage medium 108. As used herein, linear density refers to a density of recorded data bits in a down-track (DT) direction (e.g., "kilo bits per inch" or KBPI).

Like the data tracks recorded using the CMR technique of magnified view 150, the data tracks of the magnified view 152 each are defined by a same written track width. In one implementation, a track pitch (e.g., center-to-center distance between adjacent data tracks) is defined such that adjacent written data tracks slightly overlap one another. In another implementation, a track pitch is selected such that there is little or no overlap between adjacent data tracks. In either of these implementations, consecutive data tracks are written according to a non-consecutive order and according to one or more prioritized write rules. For example, data may be written to according to a prioritized write rule whereby data is directed to each data track in a first series of alternating tracks (e.g., tracks 158, 160, and 162) before any data is written to any data tracks of a second series of alternating tracks (e.g., data tracks 164, 166, etc.). In another implementation, data is written according to a similar prioritized write rule whereby a data track of a second series of alternating data tracks (e.g., 164, 166, etc.) may not receive and store data unless the two immediately adjacent tracks of the first series of alternating data tracks already store data.

In one implementation, each of the data tracks 158, 160, 162, 164, 166, etc. has a written track width that slightly exceeds a defined track pitch. That is, the track pitch or center-to-center distance between two adjacent data tracks is slightly less than a written track width of any individual track. Consequently, each data track of the second series of alternating data tracks (e.g., 164, 166, etc.) has edges that slightly overlap the directly adjacent and previously-written data tracks of the first series of alternating data tracks (e.g., tracks 158, 160, and 162). Due to careful selection of the written track width and track pitch, data remains readable on all of the data tracks of the storage medium 108. For simplicity, tracks of the first series of alternating data tracks (e.g., data tracks 158, 160, 162, etc.,) are also referred to herein as "bottom tracks," while tracks of the second series of alternating data tracks (e.g., 164, 166, etc.) are also referred to herein as "top tracks."

In one implementation, the top data tracks are randomly writable but the bottom tracks are not. For example, a top track can be written and re-written without re-writing any adjacent tracks, while a re-write or modification of a bottom track, such as the track 160, may entail reading and/or re-writing of multiple tracks. For example, re-writing the data track 160 may entail the following operations in the following order (1) reading the top data tracks 164 and 166 into memory; (2) writing the data track 160; and (3) re-writing data of the top data tracks 164 and 166 from the memory. Other data management techniques may be used in other implementations.

When the above-described prioritized write order is implemented, a risk of adjacent track interference (ATI) is eliminated for the top data tracks on the storage medium 108. As used herein, "ATI" refers to data degradation that may occur on tracks adjacent to a target data track on a magnetic recording medium when the target data track is written a large number of times without writes or re-writes of the adjacent tracks. ATI is effectively eliminated for the top data tracks because a top data track is written or re-written following each write to an adjacent bottom track.

When ATI is reduced or eliminated for the top data tracks 164, 166, etc. as described above, the linear density of these tracks can be increased without a corresponding decrease in system performance.

According to one implementation, all data tracks of the magnified view 152 are written by a single writer and according to a same set of write current parameters. "Write current parameters" are parameters affecting the shape of each electrical current pulse provided to a write coil of the writer on the transducer head 120. For example, write current parameters may include steady state write current, overshoot amplitude, overshoot duration, rise time, and fall time. In implementations where the transducer head assembly 120 includes a HAMR head, the data tracks of the magnified view 152 may each receive data while a heat source (e.g., a laser) is operated at a same power level.

In general, the above-described write technique of view 152 generates a grouping of consecutive tracks having substantially equal written track width and an increased linear density on every-other track (e.g., the top tracks). By writing the data tracks of the system 100 according to a prioritized write order (as described above) but with a single writer and a uniform set of write current parameters, increases in ADC can be attained without the consequential drawbacks of other current IMR solutions that use variable width data tracks. For example, some IMR solutions manipulate laser power or write current parameters for alternating tracks generate alternating tracks of different written widths. However, varying HAMR laser power can reduce the overall lifetime of the transducer head assembly 120 and multi-writer solutions are costlier to implement than single-writer solutions. Notably, some implementations of the disclosed technology may not provide for any actual overlap between adjacent data tracks. For example, some systems may define the track pitch to be equal to the written track width rather than less than the written track width. These systems may also achieve linear density gains for the top data tracks.

Figure 2:
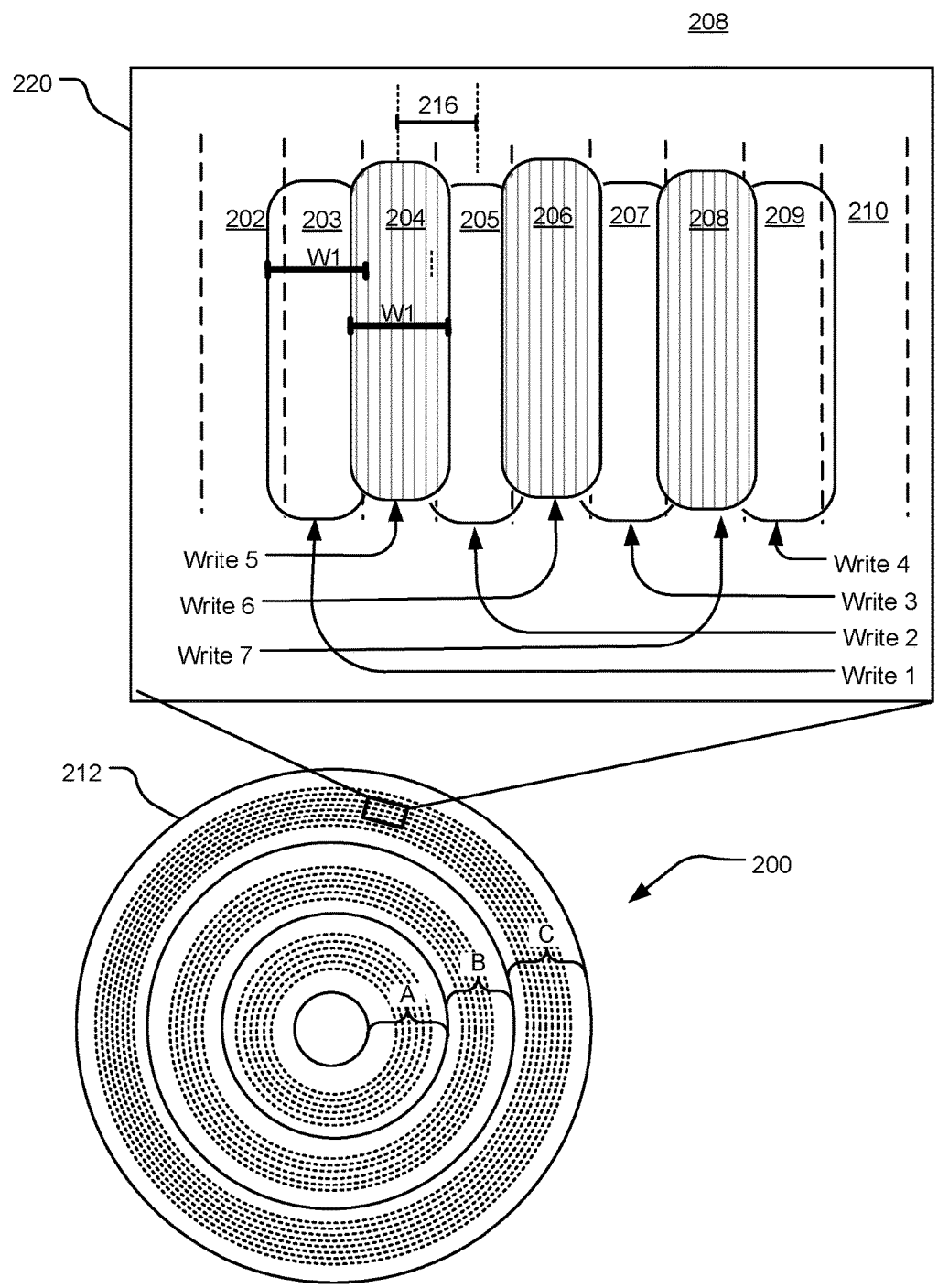
FIG. 2 illustrates an example storage system for implementing an interlaced magnetic recording (IMR) technique.

FIG. 2 illustrates a storage system 200 implementing an example IMR technique. The illustrated technique provides for data tracks of equal written track width but variable linear densities (e.g., high/low linear densities for alternating data tracks). The storage medium 212 is shown divided into different radial zones A, B, and C, but other implementations may include greater than three radial zones. As illustrated in an expanded view 220, each radial zone contains a number of data tracks (e.g., tracks 202-210) defined by a single, uniform track pitch 216 (e.g., a center-to-center distance between each pair of directly adjacent data tracks). Although the track pitch 216 is constant within each radial zone A, B, and C, the track pitch 216 may, in some implementations, vary from one radial zone to another.

Each of the data tracks 202-210 is initially written to have a same written track width W1 (e.g., an area on the storage medium 212 magnetized by a single pass of a write element). In FIG. 2, the written track width W1 is slightly larger than the track pitch 216 and, consequently, there exists some edge overlap between adjacent data tracks. In addition, data is written to the data tracks 202-210 according to a prioritized write order such that top tracks 204, 206, and 208 are written or re-written subsequent to each write to one of the immediately-adjacent bottom tracks 203, 205, 207 or 209.

Due to the illustrated overlap scheme, the top tracks 204, 206, 208, etc. are randomly writable but the bottom tracks 203, 205, 207, 209, etc. are not randomly writable. For example, a re-write of the data track 204 can be performed without re-writing any other data track, while a re-write of the data track 205 entails the following operations: (1) reading the data tracks 204 and 206 into memory; (2) re-writing the data track 205; and (3) subsequently re-writing the data tracks 204 and 206 from memory. Notably, data writes to the top tracks 204, 206, or 208 may, over time, cause adjacent track interference (ATI) on the adjacent bottom data tracks (e.g., 203, 205, 207 and/or 209). However, the reverse situation is not true. For example, re-writing a bottom data track 205 does not cause ATI to any other tracks because the immediately adjacent top tracks 204 and 206 are also re-written each time that the bottom track 205 is re-written.

Since data degradation due to ATI is not a concern on the top tracks 204, 206, 208, etc., the top tracks can be written with a higher linear density than the bottom tracks, while still yielding an acceptable signal-to-noise ratio (SNR), such as a ratio that is above a predefined threshold. As a result, the illustrated IMR technique yields an increase in ADC as compared to conventional magnetic recording systems. Although different implementations of the disclosed technology may implement different prioritized write rules, FIG. 2 includes example annotations (e.g., write 1, write 2, write 3 . . . write 7) illustrating one prioritized write order that yields that above-described increases in ADC.

Each of the different radial zones A, B, and C may store data written according to a different set of write current parameters. For example, a factory formatting process may populate a zone table (not shown) that stores a set of write current parameters (e.g., write current amplitude, write current overshoot, write current rise time, fall time, etc.) in association with each different radial zone on the storage medium 212. The zone table is used during operation of of the storage device 200 to select write current parameters for each data write to the storage medium 212. However, within any one radial zone (e.g., A, B, or C), data tracks are written according to a same set of write current parameters and at a uniform track width. In HAMR systems, the zone table may further store a laser power in association with each of the radial zones A, B, and C. A same (uniform) laser power may be used to write data to each data track in a same radial zone. In at least one implementation, the storage system 200 includes a single writer that writes data to all data tracks on the storage medium 212 or all of the data tracks on a same surface of the storage medium 212. Thus, the above-described ADC gains are achieved without costly manufacturing changes to a structure of the head including the writer (e.g., multiple writers, coils, heaters, etc.).

Figure 3:
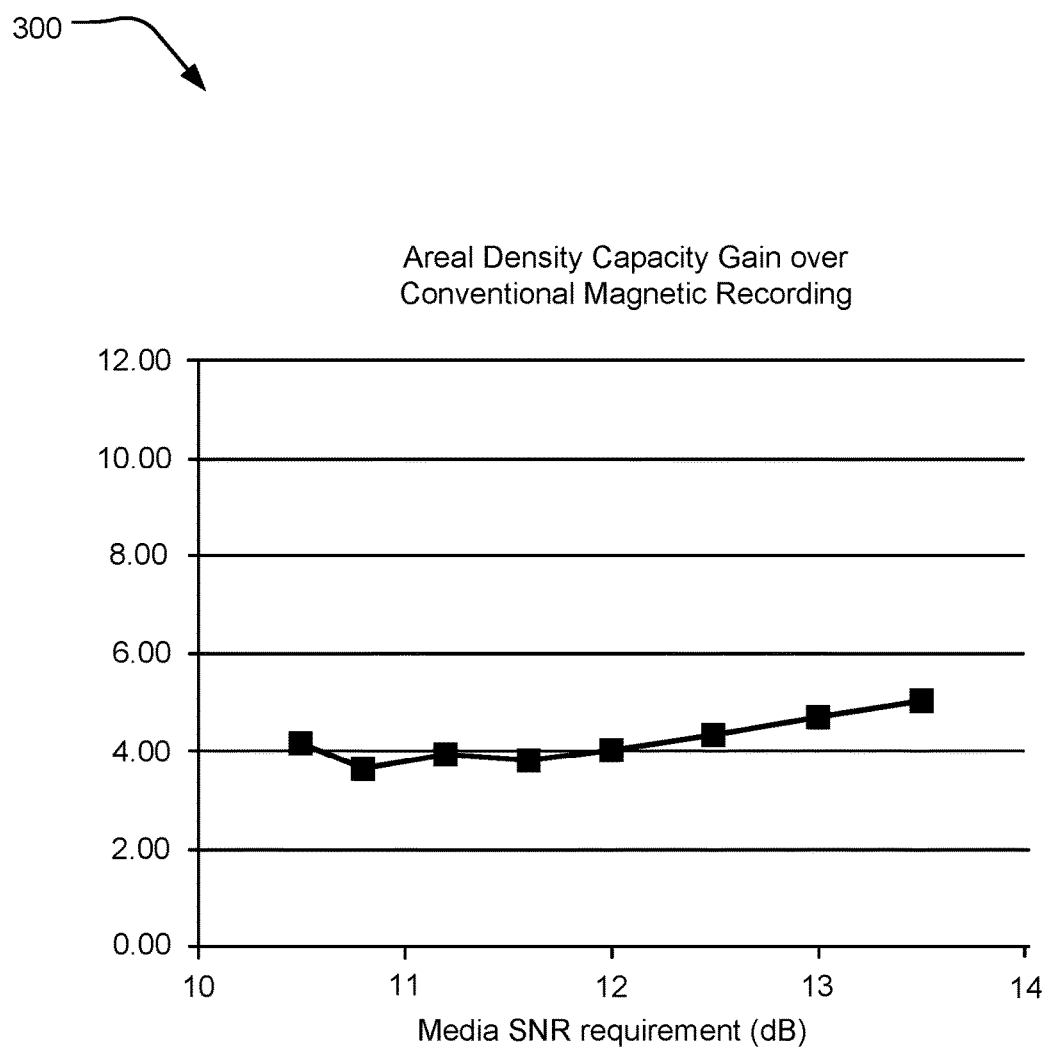
FIG. 3 illustrates an example plot illustrating a percentage gain in areal density capacity resulting from implementation of an IMR technique.

FIG. 3 illustrates an example plot 300 illustrating percentage gain in ADC observed in a system implementing the herein-disclosed IMR techniques as compared to a system implementing conventional magnetic recording techniques. Specifically, the plot 300 is based on a single-writer storage drive that writes data to a series of consecutive data tracks according to IMR prioritized write order. For instance, the prioritized write order designates a first series of alternating tracks as "bottom tracks" and a series of interlaced tracks as "top tracks." Each bottom track receives data before any data is written to the immediately adjacent top tracks, and top tracks are written with a higher linear density than the bottom tracks.

The single-writer storage drive on which the plot 300 is based includes a controller that selects a single set of write current parameters to generate adjacent, consecutive data tracks of equal written track width. For example, write current amplitude, write current overshoot, write current rise time may be kept at constant values for data writes to each track in a series of adjacent data tracks. This written track width may be slightly larger than a track pitch selected for use in a corresponding radial zone, as described and shown with respect to FIG. 2. As seen from the plot 300, ADC gains are on the order of 2-5% when a media signal to noise (SNR) requirement is varied between 10.5 and 13.5 decibels (dB).

Figure 4:
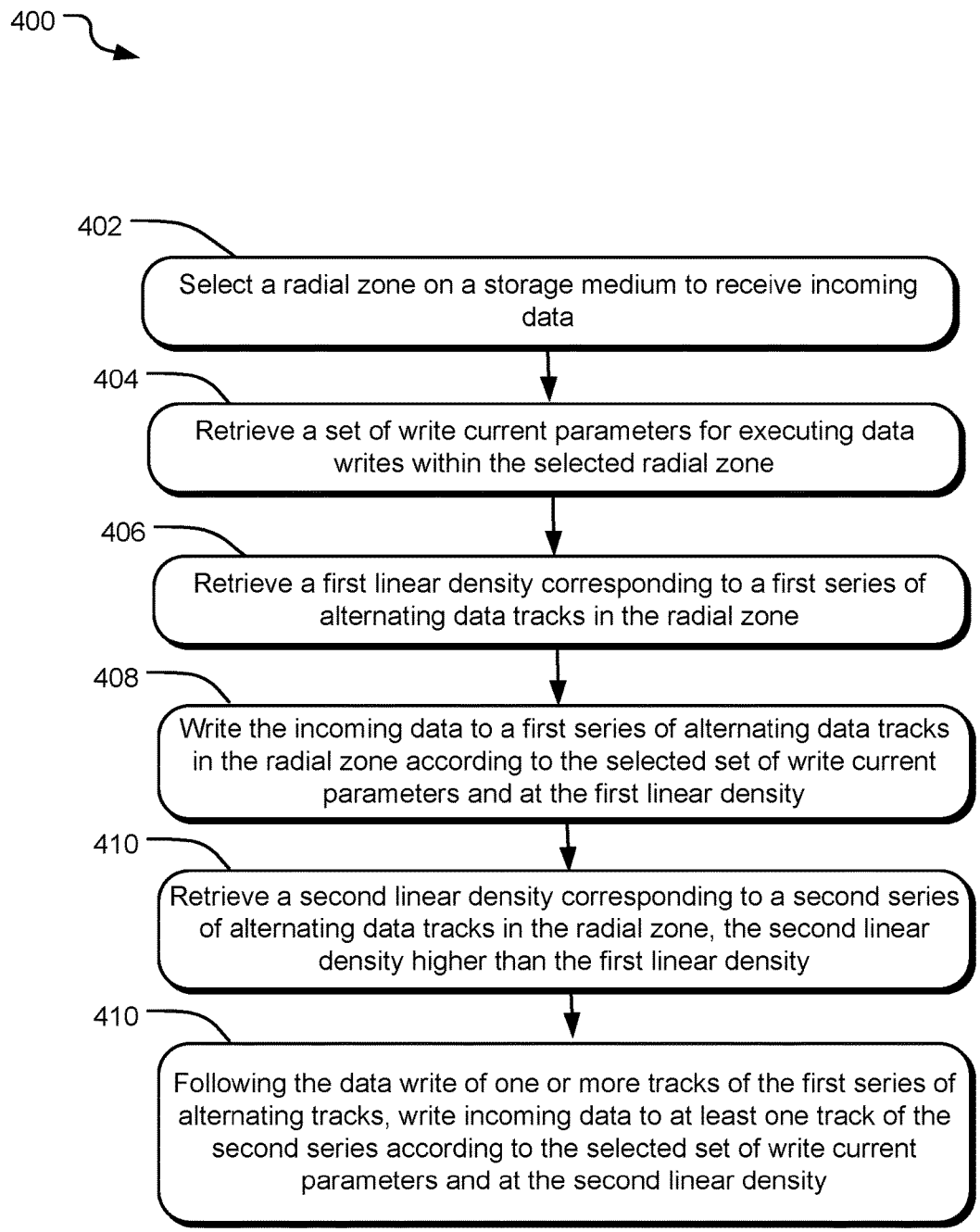
FIG. 4 illustrates example operations for writing data according to another example IMR technique.

FIG. 4 illustrates example operations 400 for writing data according to an IMR technique that writes data tracks of equal width according to a non-consecutive prioritized write order. In one implementation, the example write operations 400 are performed by a storage device that includes a single writer for writing to a surface of a storage medium.

A selection operation 402 selects a radial zone on the storage medium for receiving incoming data. A retrieving operation 404 retrieves a set of write current parameters for executing data writes within the selected radial zone. For example, the write current parameters may include a write current amplitude, a write current overshoot, a write current rise time, a write current fall time, etc. In implementations where the storage device is a HAMR device, the retrieving operation 404 may further retrieve a power level for operating the laser within the selected radial zone. The write current parameters and/or HAMR laser power are, in one implementation, pre-selected so as to generate data tracks with a written track width that slightly exceeds a defined track pitch on the storage medium. In another implementation, the retrieved write current parameters and/or HAMR laser power are pre-selected to generate data tracks with a written track width that is equal to a defined track pitch.

Another retrieving operation 406 retrieves a first linear density corresponding to a first series of alternating data tracks in the radial zone. Thereafter, a write operation 408 writes the incoming data to a first series of alternating data tracks in the radial zone according to the retrieved set of write current parameters and the first linear density. If the device is a HAMR device, the writing operation may further write the data according to the retrieved laser power level.

Another retrieving operation 410 retrieves a second linear density that corresponds to a second series of alternating data tracks in the radial zone. The second linear density is higher than the first linear density. In one implementation, the first series of alternating tracks includes every other data track in the radial zone and the second series of alternating data tracks includes the tracks interlaced with the alternating data tracks.

Subsequent to the data write to one or more of the first series of alternating data tracks, another write operation 412 writes incoming data to one or more data tracks of the second series of alternating data tracks within the radial zone. The write operation 412 writes the data according to the same set of write current parameters and HAMR laser power (if applicable) as the write operation 408. However, the write operation 412 writes the data at the second linear density, which is higher than the first linear density. As as result, all written data tracks within the radial zone have a same written track width, slightly overlapping track edges, and the data tracks of the second series store data at higher linear density than the data tracks of the first series.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
   a storage medium;
   a magnetic recording head; and
   a storage device controller configured to operate the magnetic recording head to write consecutive data tracks on the storage medium at a uniform written track width and further configured to write data to alternating data tracks of the consecutive data tracks prior to writing data to at least one interlaced data track between the alternating data tracks.

2. The system of claim 1, wherein the alternating data tracks and the at least one interlaced data track are written according to a same set of write current parameters.

3. The system of claim 2, wherein the write current parameters include write current overshoot, write current amplitude, and rise time.

4. The system of claim 1, wherein the alternating data tracks and the at least one interlaced data track have a same track pitch that is less than the written track width.

5. The apparatus of claim 1, wherein the data of the at least one interlaced data track is of a higher linear density than a linear density of data of the alternating data tracks.

6. The system of claim 1, wherein the at least one interlaced data track is directly adjacent to two of the alternating data tracks.

7. The system of claim 1, wherein the magnetic recording head is a Heat-Assisted Magnetic Recording (HAMR) head and the controller operates a laser of the HAMR head at a same power when writing data to the alternating tracks as when writing data to the at least one interlaced track.

8. A method comprising:
   writing data of a first linear density with a writer to a first set of alternating data tracks on a storage medium;
   subsequent to the data write to the first set of alternating data tracks, writing data of a second linear density with the writer to a second set of alternating data tracks interlaced with the first set of alternating data tracks, wherein the second linear density is higher than the first linear density.

9. The method of claim 8, wherein the first set of alternating data tracks and the second set of alternating data tracks are written according to a same set of write current parameters.

10. The method of claim 9, wherein the magnetic recording head is a Heat-Assisted Magnetic Recording (HAMR) head and the controller operates a laser of the HAMR head at a same power when writing data to the alternating tracks as when writing data to the at least one interlaced track.

11. The method of claim 8, wherein the first set of alternating data tracks and the second set of alternating data tracks have equal written track width.

12. The method of claim 8, wherein each data track of the second set of alternating data tracks is directly adjacent to two data tracks of the first set of alternating data tracks.

13. The method of claim 8, further comprising:
   receiving a command to re-write data of a target track of the first set of alternating data tracks;
   writing the data to the target track; and
   subsequently re-writing data of two data tracks of the second set of alternating tracks directly adjacent to the target track.

14. The method of claim 8, further comprising:
   receiving a command to re-write data of a target data track of the second set of alternating data tracks; and
   executing the command by writing the data to the target data track without re-writing any directly adjacent data tracks.

15. One or more non-transitory computer-readable storage media encoding computer-executable instructions for executing on a computer system a computer process, the computer process comprising:
   writing data with a writer to a first set of alternating data tracks on a storage medium;
   subsequent to the data write to the first set of alternating data tracks, writing data with the writer to a second set of alternating data tracks interlaced with the first set of alternating data tracks, wherein the first set of alternating data tracks and the second set of alternating data tracks are of a same written track width.

16. The one or more non-transitory computer-readable storage media of claim 15, wherein the first set of alternating data tracks and the second set of alternating data tracks are written according to a same set of write current parameters.

17. The one or more non-transitory computer-readable storage media of claim 16, wherein the write current parameters include write current overshoot, write current amplitude, and rise time.

18. The one or more non-transitory computer-readable storage media of claim 15, wherein each data track of the second set of alternating data tracks is directly adjacent to two data tracks of the first set of alternating data tracks.

19. The one or more non-transitory computer-readable storage media of claim 15, wherein the magnetic recording head is a Heat-Assisted Magnetic Recording (HAMR) head and the controller operates a laser of the HAMR head at a same power when writing data to the alternating tracks as when writing data to the at least one interlaced track.

20. The one or more non-transitory computer-readable storage media of claim 15, wherein a linear density of the data stored on the second set of alternating data tracks is higher than a linear density of data stored on the first set of alternating data tracks.

* * * * *